United States Patent [19]

Travis

[11] Patent Number: 5,058,675
[45] Date of Patent: Oct. 22, 1991

[54] METHOD AND APPARATUS FOR THE DESTRUCTIVE DISTILLATION OF KEROGEN IN SITU

[76] Inventor: Elmer E. Travis, 10804 Central S.E., #23, Albuquerque, N. Mex. 87123

[21] Appl. No.: 604,219

[22] Filed: Oct. 29, 1990

[51] Int. Cl.⁵ ............................ E21B 43/24; F24J 3/02
[52] U.S. Cl. .................................. 166/272; 126/425; 166/303
[58] Field of Search ........................ 166/272, 303, 57; 126/425

[56] References Cited

U.S. PATENT DOCUMENTS

| | | | |
|---|---|---|---|
| 4,174,752 | 11/1979 | Slater et al. | 166/272 X |
| 4,249,605 | 2/1981 | Slater et al. | 166/266 |
| 4,289,204 | 9/1981 | Stewart | 166/302 X |
| 4,408,665 | 10/1983 | Dougan | 166/266 |
| 4,456,065 | 6/1984 | Heim et al. | 166/272 X |
| 4,456,066 | 6/1984 | Shu | 166/272 |
| 4,513,733 | 4/1985 | Braun | 126/435 |
| 4,515,215 | 5/1985 | Heines et al. | 166/272 |
| 4,522,260 | 6/1985 | Wolcott, Jr. | 166/272 X |
| 4,574,886 | 3/1986 | Hopkins et al. | 166/272 |
| 4,641,710 | 2/1987 | Klinger | 166/303 |
| 4,703,798 | 11/1987 | Friedman | 166/271 |
| 4,793,415 | 12/1988 | Holmes et al. | 166/263 |
| 4,848,466 | 7/1989 | Lin | 166/273 |

*Primary Examiner*—William P. Neuder
*Attorney, Agent, or Firm*—Henderson & Sturm

[57] ABSTRACT

A method and apparatus for the destructive distillation of kerogen and extraction of oil and gas from oil shale. The method and apparatus includes generating super heated steam or air, injecting super heated steam or air into oil shale, heating the kerogen in the oil shale to a sufficient temperature such that the kerogen breaks down into shale oil and gas, collecting the oil and gas, and extracting the oil and gas. The super heated steam is generated by the use of a sun furnace which includes a high pressure boiler and a solar collector which focuses the rays of the sun on the boiler. The extreme heat and pressure generated by the sun furnace forces the heat-carrying steam or air along the laminations and cleavages of the shale to breakdown the kerogen into oil and gas.

10 Claims, 2 Drawing Sheets

METHOD AND APPARATUS FOR THE DESTRUCTIVE DISTILLATION OF KEROGEN IN SITU

TECHNICAL FIELD

This invention relates generally to in situ recovery of oil from kerogen containing shale and specifically to a destructive distillation system utilizing a sun furnace to generate the required super heated steam or air.

BACKGROUND ART

Oil shales are widely distributed throughout the world and throughout the geologic column. Large amounts of oil may be derived from them and they can be made a substitute for naturally occurring liquid petroleums.

"Oil shale" is a term applied to several kinds of organic and bituminous shales consisting of varying mixtures of organic matter with shale and clay. The organic matter is mainly in the form of a mineraloid, called Kerogen.

There are two types of kerogen—a coaly type and an oily type. The oily type of kerogen is the type this invention applies to. Although oil shales are widely distributed throughout the world, there are not many places where they are concentrated in amounts great enough to exploit commercially. The Green River Formation is one such place. This formation covers thousands of square miles and is from 1500 feet to 2000 feet thick.

Great amounts of oily type kerogen are contained in the shales of the Green River Formation, located in Utah, Colorado and Wyoming. There are billions of barrels of oil in solid form (kerogen) located in these shales. The present invention relates to the recovery of the oil from the kerogen containing shale in this formation.

Oil can be recovered from these kerogen shales by heating. This invention puts forth a method of heating the kerogen in situ and drawing off the oil thus formed as from a normal liquid petroleum oil well.

Various solutions for the in situ recovery of the kerogen have been proposed. Common to most efforts is the use of thermal breakdown. The kerogen is heated in situ and breaks down into shale oil and gas which can be efficiently recovered. Generating the required heat for the chemical decomposition (pyrolysis) usually has been accomplished by either burning a portion of the kerogen or by injecting or circulating hot fluids or steam.

Previous solutions have all had significant disadvantages. For example, U.S. Pat. No. 4,408,665 to Dougan requires that the shale be water-flooded and is a supplement to mining when the mine gets flooded. Recovery is dependent on the use of the water to float-out the shale oil. Kerogen located in shale not water-flooded and therefore cannot use this recovery process. Another disadvantage commonly encountered is the requirement that some fuel be burned during the process of recovery. With these prior art methods, either fuel must be burned on the surface to heat the fluid to be injected into the shale or some of the kerogen must be burned to generate the heat in situ. Additionally, the burning of fuel during the recover process creates unnecessary pollution and makes automation of the recovery process extremely difficult.

A solution is needed that is capable of generating enough heat and pressure such that the process will work in impermeable shale and does not require the burning of fuel, is pollution free, can be completely automated therefore requiring little or no maintenance and is not labor intensive.

DISCLOSURE OF THE INVENTION

The present invention provides a low maintenance, economical process for the in situ recovery of oil from kerogen containing shale. A high pressure boiler, located above ground, is heated to high temperatures using a solar collector and the energy of the sun. The high pressure boiler and the solar collector, hereafter in combination referred to as a sun furnace, will be capable of heating the water or air inside the boiler to a temperature of 2,000 degrees Fahrenheit. The steam or air at this temperature and pressure will be injected into the oil shale formation. When the temperature of the oil shale reaches approximately 800 to 1,000 degrees Fahrenheit, the kerogen will breakdown into shale oil. The shale oil can then be extracted from the retort as the newly formed oil will flow to the lowest point in the retort (reservoir). The steam or air can be released into the layer of oil shale using a perforated pipe or a retort blasted into the layer of oil shale. The oil can be extracted using either a perforated pipe or reservoirs blasted into the layer of oil shale. The oil extraction area can be located away from the area where the steam or air is released. The pressure of the steam or air will force the oil away from the release area and therefore toward the extraction area.

The sun furnace will operate every day. The heat will accumulate as the overburden will insulate the oil shale from heat loss. The build up of heat will continue day after day until eventually the temperature of the oil shale will be such that the breakdown of kerogen, and therefore the extraction of oil and gas is a continuous process.

The extreme heat and pressure created by the present invention will enhance permeability in the shales. Blasting open the retort and reservoirs will also tend to open passages in the shale.

The solar collector is positioned on an arc of track located around the boiler. The solar collector is moved along the arc of track such that the collector will follow the sun across the sky and keep the rays of the sun focused always on the boiler. When the sun sets, the solar collector will move back around to the other side of the track enabling it to pick up the first rays of the morning sun. Additionally, the solar collector will be able to tilt up and down in its universal mount to compensate for vertical changes in the sun's position and to track the sun across the sky. The position and tilt of the solar collector can be controlled by a computer such that sun's rays are always focused on the boiler. The sun furnace, in addition to generating high-pressure, high-temperature steam or air, can also be used to generate the required electricity to position and tilt the solar collector and operate the computer and to keep the batteries charged.

An object of the present invention is to provide a system of in situ recovery of oil from shale containing kerogen.

Another object of the present invention is to provide a system of in situ, shale oil recovery which is capable of generating extremely high temperatures and pressures, thereby producing super heated steam or air which can be injected into oil shale to induce chemical decomposition of kerogen into oil.

A further object of the present invention is to provide an in situ recovery system which is fuel efficient, pollution free, and capable of generating its own electrical requirements.

A still further object of the present invention is to provide an in situ, shale oil recovery system which can be completely automated and require little or now maintenance and is not labor intensive.

Other objects, advantages and novel features of the present invention will become apparent from the following detailed description of the invention when considered in conjunction with the accompanying drawings.

BEST MODE FOR CARRYING OUT THE INVENTION

Figure 1:
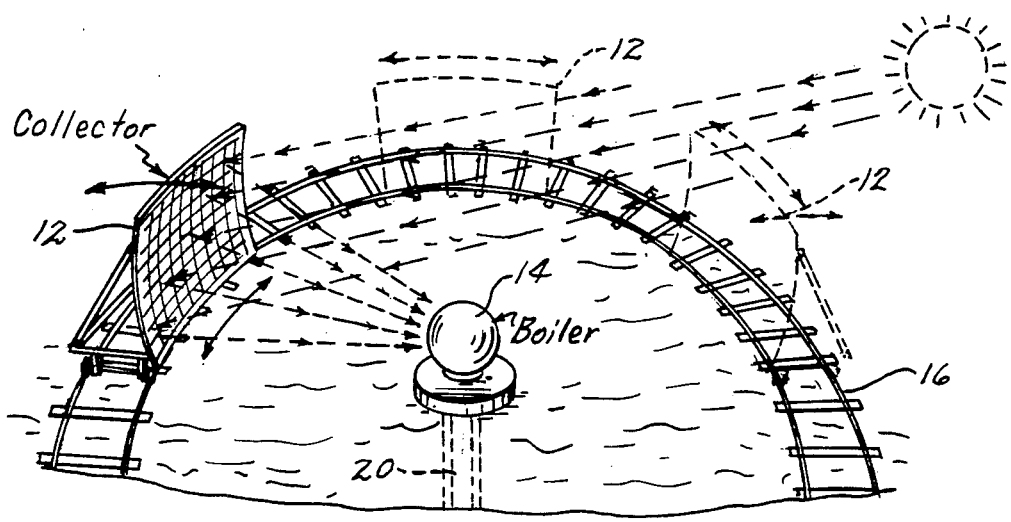
FIG. 1 is a partial perspective view of the present invention showing the high pressure boiler, solar collector and the track for positioning the solar collector.
Figure 2:
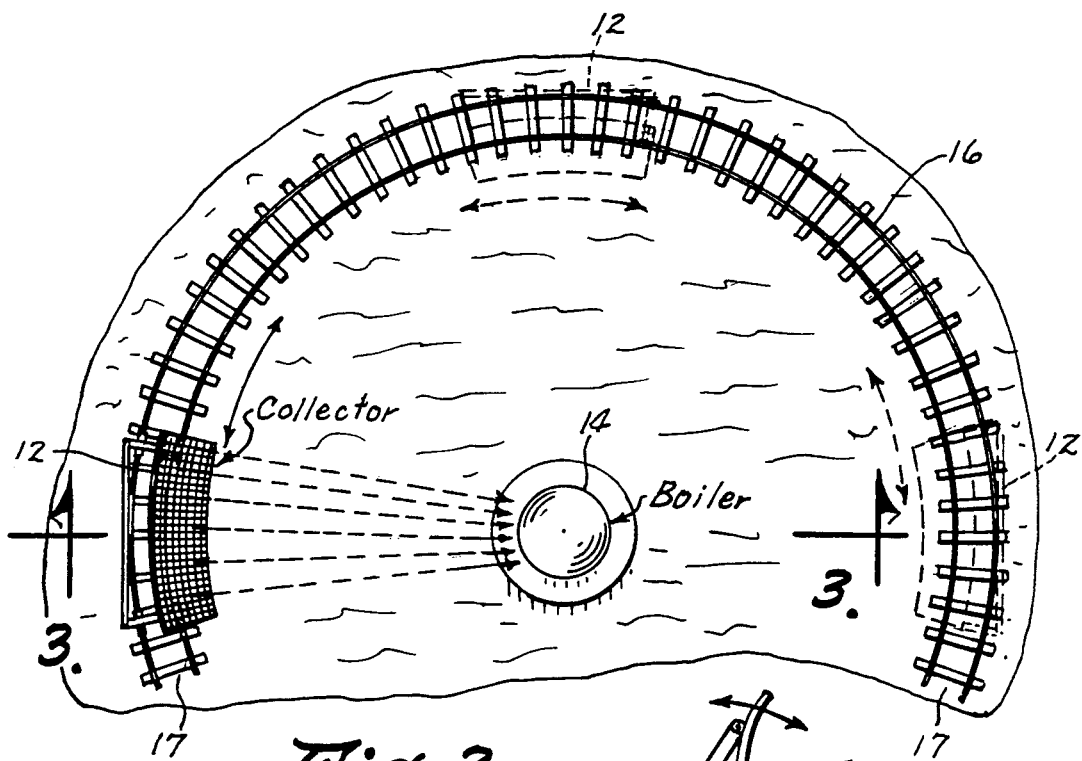
FIG. 2 is a top plan view of the partial perspective view shown in FIG. 1.

Referring now to the drawings wherein like reference numerals designate identical or corresponding parts throughout the several views, FIGS. 1-2 show a solar collector (12) and a high pressure boiler (14) built in accordance with the present invention. The solar collector (12) reflects the ray of the sun and directs them toward the high pressure boiler (14). The solar collector (12) is positioned on an arc of track (16). The solar collector (12) may be positioned at any point between the two ends (17) of the arc of track (16). The solar collector (12) moves around the arc of track (16) as the sun moves across the sky. Movement around the arc of track (16) allows the solar collector (12) to continually focus the rays of the sun on the high pressure boiler (14).

Figure 3:
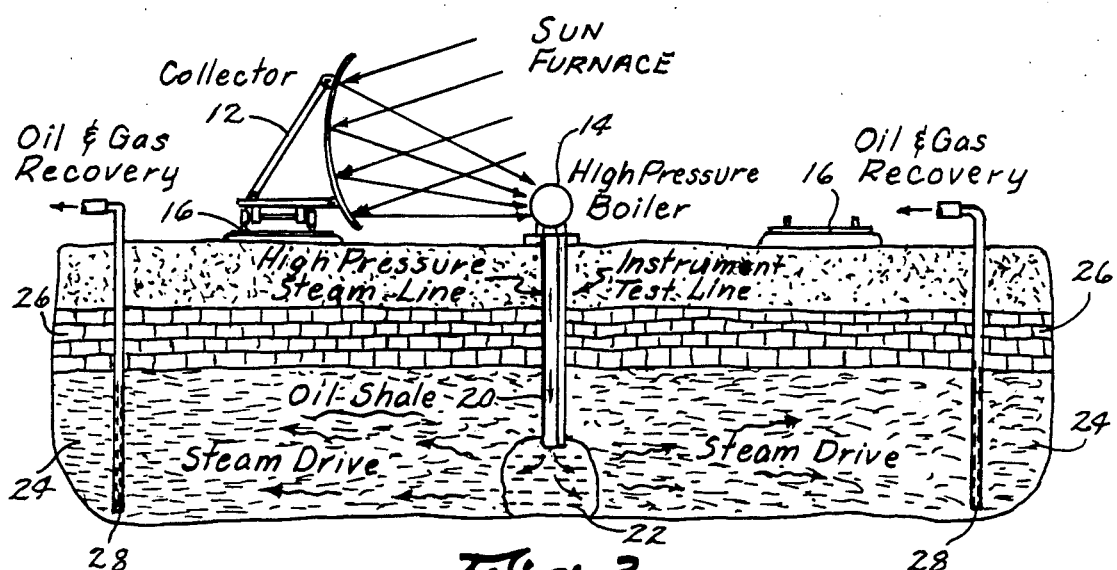
FIG. 3 is side elevational view of one embodiment of the present invention using a retort for the release of the super heated steam or air and perforated pipe for the recovery of the shale oil.

Referring now to FIG. 3, one embodiment constructed in accordance with the present inventions comprises the solar collector (12), the arc of track (16) and the high pressure boiler (14) as described in FIGS. 1-2. The water or air in the high pressure boiler (14) is heated to a temperature around 2,000 degrees Fahrenheit. The super heated steam generated by this heating is injected through a high pressure line (20) into a retort (22) blasted into the oil shale (24).

As the super heated steam is released into the retort (22) and raises the temperature of the oil shale (24), the kerogen in the oil shale (24) breaks down into oil and gas. The temperature and pressure built up during each day of heating is not lost as the overburden (26) insulates the oil shale (24) from heat loss. The extreme heat and pressure will induce permeability in the oil shale (24) and the pressure will drive the oil and gas away from the retort (22) to the lower pressure of the perforated recovery lines (28). Perforated recovery lines (28) positioned to collect the oil and gas as it moves away from the retort (22). The oil and gas can then be efficiently extracted from the perforated recovery lines (28).

Figure 4:
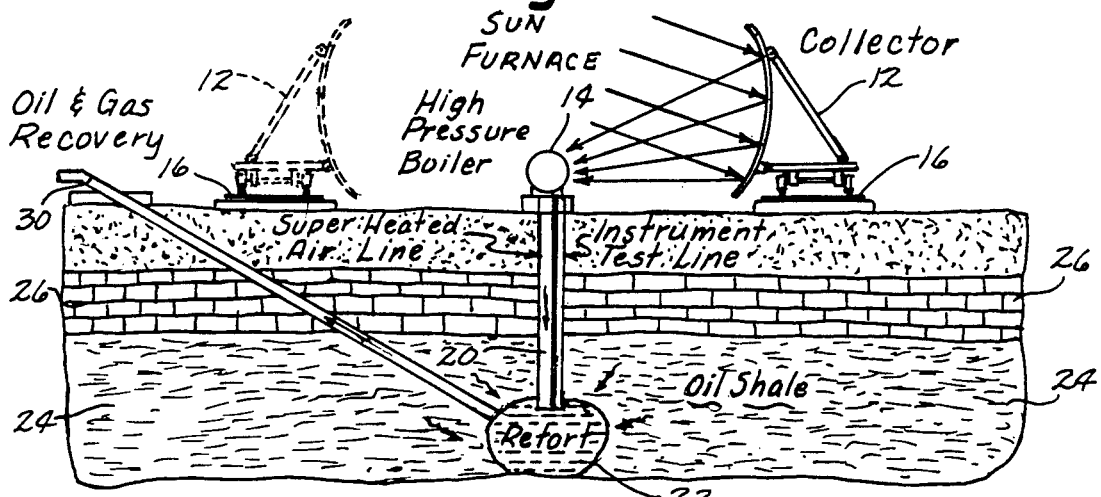
FIG. 4 is a side elevational view of another embodiment of the present invention using a single retort for the release of the super heated steam or air and recovery of the oil.

Referring now to FIG. 4, another embodiment built in accordance with the present invention comprises the solar collector (12), the arc of track (16), the high pressure boiler (14), the high pressure steam line (20), and the retort (22) as described in FIG. 3. The modification of this embodiment consists of using a recovery pipe (30) to extract the oil and gas from the retort (22). When the recovery line is opened, the oil and gas that has accumulated at this low point will be forced out of the line to the lowest area of pressure, the surface.

Figure 5:
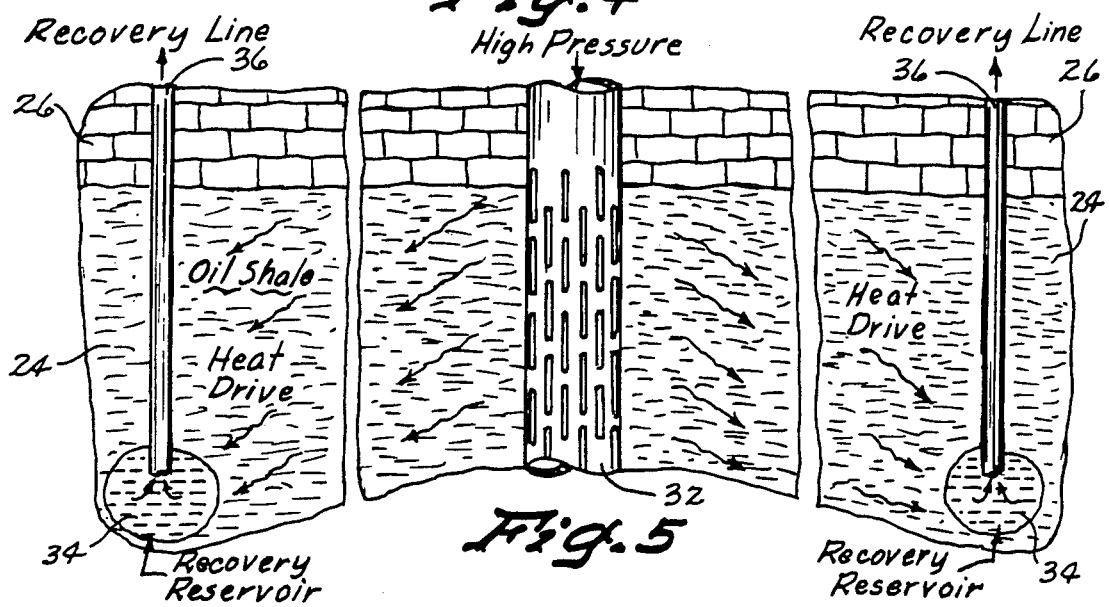
FIG. 5 is an enlarged partial side elevational view a variation of the present embodiment showing the use of a perforated pipe for the release of the super heated steam or air, reservoirs for the collection of the shale oil, and recovery lines for the extraction of the oil.

FIG. 5 shows alternative methods of releasing the steam into the oil shale (24) and recovering the oil and gas. The super heated steam generated by the high pressure boiler (14) is released into the oil shale (24) using a perforated steam or air line (32). As in the previously described embodiments, the extreme temperature and pressure causes the kerogen to breakdown into oil and gas, induces the permeability in the oil shale (24) and forces the oil and gas away from the perforated steam or air pipe (32). Toward the low pressure of the recovery line, the recovery line will act as artesian-type oil wells.

Recovery of the oil and gas can be accomplished using recovery reservoirs (34) blasted into the oil shale (24). As the oil and gas are broken down to liquid and gas, the liquid oil will move to the lowest point in the reservoir and the gas to the lowest pressure point, the recovery line in the reservoir, and are extracted through recovery lines (36).

In embodiments, the extreme temperatures cause the breakdown of kerogen to become a constant process. The process continually produces oil and gas, and therefore, the extraction also become a continuous process.

Figure 6:
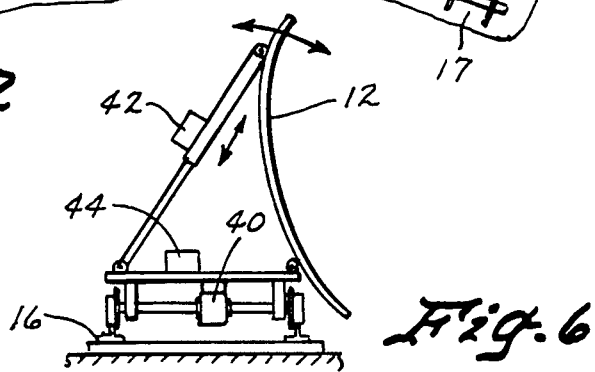
FIG. 6 is a side elevational view of the solar collector shown on the arc of track.

FIG. 6 shows the solar collector (12) located on the arc of track (16). The solar collector (12) is positioned on the arc of track (16) by the positioning mechanism (40). The solar collector (12) is positioned such that it always faces the sun. The solar collector (12) is also tilted by the tilting device (42) such that rays of the sun are always focused on the high pressure boiler (14). The positioning mechanism (40) and the tilting device (42) are controlled by a computer (44) which signals to the positioning mechanism (40) and the tilting device (42) the exact position and tilt required to focus the sun's rays on the high pressure boiler (14).

The process of the present invention described above can extract oil from kerogen containing oil shale which is either water flooded or not water flooded.

Accordingly, it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. An in situ method for the extraction of oil from the impermeable shales by destructive distillation of the kerogen therein comprising the following steps:

boring at least one injection well in said oil shale;
   boring an extraction well in said oil shale;
   injecting super heated steam or air into said injection well;
   heating said oil shale to a temperature sufficient to cause the kerogen in said oil shale to breakdown into oil and gas, said super heated steam being heated using a high pressure boiler and focusing the sun on said boiler, said focusing of the sun being accomplished by a solar collector connected to an arc of track wherein said solar collector is selectively positioned between the two ends of said track and wherein said high pressure boiler is located at the center of said arc; and
   extracting the oil and gas through said extraction well.

2. The method of claim 1 wherein super heated air is injected into said injection well and used to heat said oil shale.

3. The method of claim 1 wherein said extraction well is bored to a retort at the bottom of said injection well whereby said super heated steam is released from said injection well using said retort located at the end of said injection well.

4. The method of claim 1 wherein said super heated steam is released from said injection well using a perforated pipe.

5. The method of claim 1 wherein a computer is used to control the positioning of said solar collector whereby said solar collector is always positioned such that the rays of the sun are always focused upon said high pressure boiler.

6. Apparatus for the extraction of shale oil from kerogen contained in impermeable oil shale by destructive distillation comprising:

means for producing super heated steam, said means for producing super heated steam comprising a sun furnace, said sun furnace comprising a high pressure boiler and means for focusing the rays of the sun on said high pressure boiler, and wherein said focusing means comprises:
   a solar collector;
   an arc of track wherein said high pressure boiler is located at the center of said arc of track;
   means for positioning said solar collector along said arc of track; and
   means for controlling said positioning means whereby said solar collector is always positioned such that the rays of the sun are always focused upon said high pressure boiler;
   means for transmitting said super heated steam into said oil shale whereby said oil shale is heated by said super heated steam to a sufficient temperature and whereby said kerogen in said oil shale breaks down and forms shale oil;
   means for collecting said shale oil; and
   means for extracting said shale oil from said collecting means.

7. The apparatus of claim 6 wherein super heated air is produced and transmitted into said oil shale.

8. The apparatus of claim 6 wherein said transmitting means comprises a high pressure steam line and a retort.

9. The apparatus of claim 6 wherein said transmitting means comprises a high pressure perforated pipe.

10. The apparatus of claim 6 wherein said controlling means comprises a computer.

* * * * *